United States Patent
Amra

[19]

[11] Patent Number: 6,050,723
[45] Date of Patent: Apr. 18, 2000

[54] HIGH TEMPERATURE THERMOCOUPLE ASSEMBLY FOR MEASURING MOLTEN METAL TEMPERATURES

[76] Inventor: Lutfi H. Amra, 1221 Sylvania Rd., Cleveland Hts., Ohio 44121

[21] Appl. No.: 09/059,923

[22] Filed: Apr. 14, 1998

[51] Int. Cl.[7] ....................................................... G01K 1/12
[52] U.S. Cl. ............................................. 374/140; 374/139
[58] Field of Search ............................... 374/140, 1, 208, 374/183

[56] References Cited

U.S. PATENT DOCUMENTS

| | | | |
|---|---|---|---|
| 4,630,594 | 12/1986 | Ellersick | 126/64 |
| 4,692,556 | 9/1987 | Bollen et al. | 136/234 |
| 4,934,831 | 6/1990 | Volbrecht | 374/183 |
| 5,181,779 | 1/1993 | Shia et al. | 374/208 |
| 5,197,805 | 3/1993 | Wilson | 374/208 |
| 5,209,571 | 5/1993 | Kendall | 374/139 |
| 5,242,226 | 9/1993 | Ross et al. | 374/208 |
| 5,427,452 | 6/1995 | Stuart | 374/179 |
| 5,456,761 | 10/1995 | Auger et al. | 374/179 |
| 5,520,461 | 5/1996 | Curry et al. | 374/208 |
| 5,675,118 | 10/1997 | Kortvelyessy | 374/208 |
| 5,850,073 | 12/1998 | Eckert | 219/523 |

FOREIGN PATENT DOCUMENTS

| | | | |
|---|---|---|---|
| 3811825 | 10/1989 | Germany | 374/208 |
| 1299424 | 12/1989 | Japan | 374/208 |

*Primary Examiner*—Adolf Deneke Berhane
*Assistant Examiner*—Pia Tibbits
*Attorney, Agent, or Firm*—Vytas R. Matas

[57] ABSTRACT

A high temperature long life thermocouple assembly for measuring continuous molten metal temperatures is made from thermocouple protection tube of insulating materials fabricated by rolling to form an open ended tube which resists attack of molten metals by dissolution and oxidation. The tube is plugged from one end, which is the sensing end of the thermocouple, with a plug made of a different material than the tube body and is cemented to the tube. The cement used is a special high temperature mortar which adheres to the plug and the tube. The plug is made of special graphite by infiltrating into it certain corrosion salt inhibitors. When assembled the tube encases the thermocouple protecting it from dissolution and failure upon immersion in molten metal. This device makes it feasible to monitor continuously for days the temperature of molten metals and alloys, in corrosive atmospheres at temperatures as high as 2820° F. The durability and life of the tube is attainable because the tube's resistance to molten metals and its light weight.

10 Claims, 2 Drawing Sheets

HIGH TEMPERATURE THERMOCOUPLE ASSEMBLY FOR MEASURING MOLTEN METAL TEMPERATURES

BACKGROUND OF THE INVENTION

1. Field of the Invention

The present invention generally relates to high temperature thermocouple assemblies and particularly to immersible molten metal temperature measuring devices having a long life in molten metal temperature measurement applications and corrosion resistance to such immersion in molten metals such as aluminum alloys and steel.

2. Description of the Prior Art

In melting and casting metals such as aluminum alloys and in steel making the continuous measurement of the temperature of the molten metal is of great importance in controlling the quality of the product and the profitability to the metal manufacturer. Continuous temperature measurement is necessary to produce castings of zero defect and to enhance productivity in general. It is essential that a continuous reading of the metal bath temperature is kept within control limits during metal melting and casting so that this information may be accurately and continuously feed into control systems to allow decision making for optimum times to initiate the casting and pouring of the metal for various manufacturing processes.

To produce thermocouple which are suited for measuring the elevated temperatures found in molten metals, various devices are know such as ceramic protectors for thermocouple. These known devices suffered from an early failure of the thermocouple device upon actual use beyond short undesirable time period. This early failure resulted in a great loss for the metal producer because of the repeated interruption in production necessary to replace failed thermocouples resulting in a more costly product. Therefore, thermocouple assemblies were needed which provided durability, integrity and which were resistant to erosion, dissolution and rupture upon insertion in high temperature molten metals. The terms "high temperature" and "elevated temperature" as used herein refers to temperatures, generally within a range of approximately 538–1550° C. Criteria considered in selecting thermocouple for use in molten metal requires longevity of the devise under consideration. It is of paramount importance to increase the usage time of the thermocouple in order to not interrupt production especially in industries using metal casting and tapping of metals from a furnace and especially in recycling hearth furnaces for aluminum recycling and purification. In industry, to obtain quality controlled product and measuring parameters which affect metal refining, prevention of segregation within the metal, continuous measuring of temperature in continuous casting, are of a paramount importance for consideration in recommending and use of thermocouple assemblies.

Known thermocouple assemblies use certain ceramics and cements to protect thermocouple leads which constitute the sensor device. Many references appeared in prior U.S. patents with emphasis in incorporating protective tubes made of materials which possess certain physical and chemical properties. These properties usually incorporate low thermal expansion, high melting point, stability (insoluble) in molten metal, rupture strength and low cost. Also, the relationship, dimensions of the parts included in constructing the thermocouple assemblies are of utmost importance in order to make a feasible and usable thermocouple.

Known materials for such applications are refractories, and glass covering protectors for same. Such materials are disclosed in three U.S. Pat. Nos. 4,060,095; 4,135,538 and 4,216,028 by Kruita. These U.S. patents describe configurations and assemblies for thermocouple protective tubes composed of multiple layers of ceramic paper formed into a tube protected by a silica glass cover. The above described thermocouple assemblies were usable for several hours in measuring molten metal temperature before they had to be replaced. Of course the process using these thermocouples had to be shut down to effect a replacement of the thermocouple. This replacement requirement slowed down the melting process adding to the cost of the ultimate product.

Other known high temperature thermocouple assemblies are described in U.S. Pat. No. 5,654,034. These devices use SiC,CVD formed on the end of the thermocouple assembly. Other high temperature devices are also known but their applications involved measuring air temperature in gas fired burners and obviously not molten metals.

The problem of thermocouple wear in molten metal also needed improvement for corrosion and wear resistance.

Thus what was needed was a thermocouple protection tube which will provide a thermocouple assembly for molten metal temperature measurement which is both shock and wear resistant, easy to use and assemble and has a longer life in the order of days rather than a few hours.

BRIEF SUMMARY OF THE INVENTION

The present invention solves the problems associated with prior art molten metal temperature measurement devices such as thermocouple assemblies as well as others by providing a technique for the production of corrosion and wear resistant thermocouple protection sleeves composed of various parts cemented together with a high temperature cement to produce a long life molten metal thermocouple assembly.

To accomplish same, parts which make up the thermocouple protection tube or sleeve are assembled using an insulating tube of refractory oxides which possess low thermal heat conductivity in conjunction with a high thermal conductive end plug for the tube made from material such as plasma flame sprayed graphite which was found to be especially useful for temperature measurements in molten aluminum applications. This combination prevents molten metal reaction with the thermocouple and enhances sensing temperatures through the temperature conducting graphite plug to the thermocouple. The plug is inserted into one end of the tube and sealed therein using a high temperature cement/coating consisting essentially of a mixture of non-plastic and plastic refractory minerals essentially of alumino-silicate being 75% nominal weight and 25% sodium silicate dissolved in water to act as a binder. The above selected materials incorporated into, the sleeve and the design of the thermocouple protection sleeve produced a long life thermocouple assembly lasting for days in molten metal temperature measuring applications. The assembly also was immune to thermal shock and chemical erosion in molten metals up to 1550 degrees Centigrade.

In view of the foregoing it will be seen that one aspect of the present invention is to provide a molten metal temperature measuring device having a life expectancy numbering in days for molten steel applications and longer for aluminum application due to the lower temperature of molten aluminum.

Another aspect of the present invention is to provide a composite protective tube for molten metal temperature measuring thermocouple which has a fast reaction time to temperature changes in molten metal and a long life in such applications.

Still another aspect of the present invention is to provide a protective sleeve for temperature measuring devices which is immune to thermal shock and chemical erosion when used in molten metal applications.

These and other aspects of the present invention will be more fully understood after a review of the following description of the preferred embodiment when considered in combination with the associated drawings.

DETAILED DESCRIPTION OF THE PREFERRED EMBODIMENT

Figure 1:
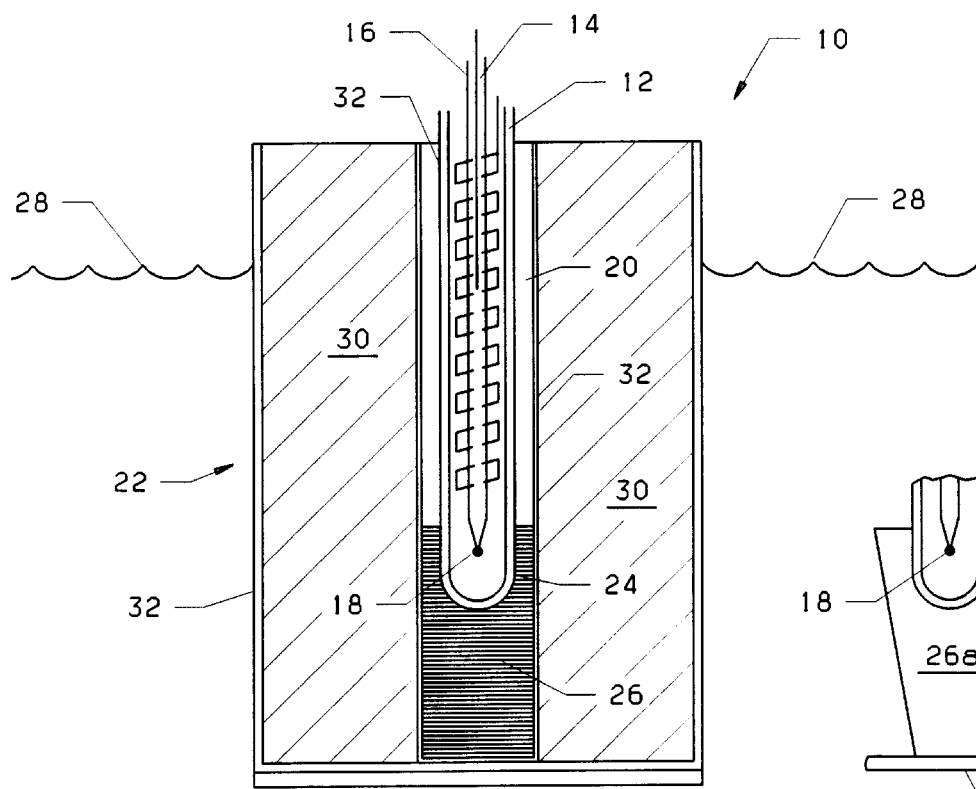
FIG. 1 is a cross section view of the high temperature thermocouple assembly of the present invention.
Figure 2:
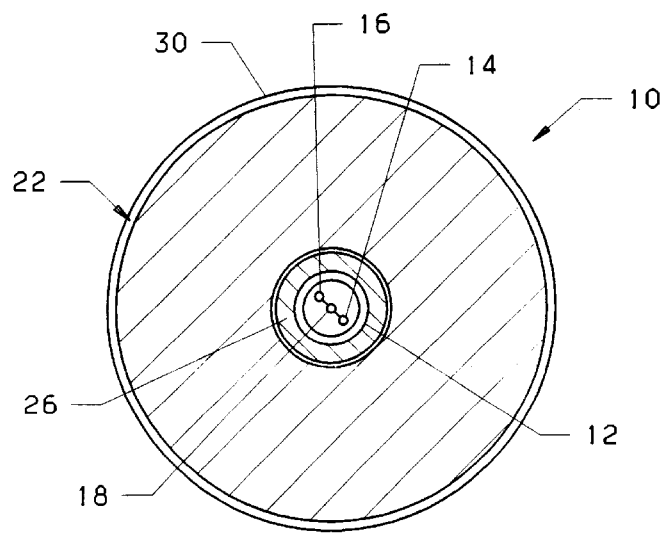
FIG. 2 is a top view of the FIG. 1 high temperature thermocouple assembly.

Referring now to the drawings wherein the showings are for purposes of describing a preferred embodiment of the invention and not for limiting it thereto, FIGS. 1 and 2 show a high temperature long life thermocouple assembly (10) intended for use in continuous measurement of molten metal temperatures. Such measurements are used in various metal forming or casting processes to insure the production of consistent quality goods from the automated control of such processes based at least in part on the accurate and continuous measurement of the temperature of molten metal.

A high temperature thermocouple assembly (10) has a known tubularly enclosed thermocouple device (12) having a pair of leads of dissimilar metal (14,16) connected at one end to form a measuring junction (18). This junction forms a varying differential voltage between leads (14, 16) which is proportional to the temperature sensed by the junction (18). This measurement can then be used to monitor and/or control various molten metal processes.

Figure 1A:
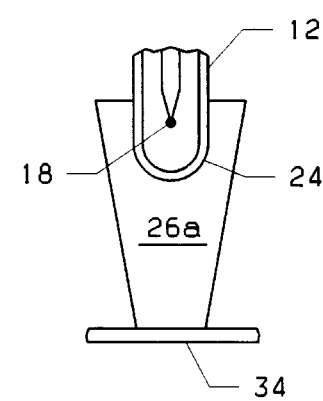
FIG. 1(a) is an expanded view of an alternate conical plug design which may be used to replace the plug shown in FIG. 1.

The thermocouple device (12) is inserted inside an open annulus (20) of a protective tube assembly (22) to have the measuring junction (18) sitting in an opening (24) formed at one end of a high temperature conductive plug (26) sealing one end of the tube assembly (22), an alternative conical plug (26a) design shown in FIG. 1(a) may be used to replace the plug 26 to increase the response time of the thermocouple 18. As is best seen in FIG. 1 the thermocouple assembly (10) is slowly inserted into molten metal to minimize thermal shock. The insertion continues until the thermocouple is inserted to a level (28) to cover the junction (18) but not to totally immerse the thermocouple assembly (10).

Figure 3:
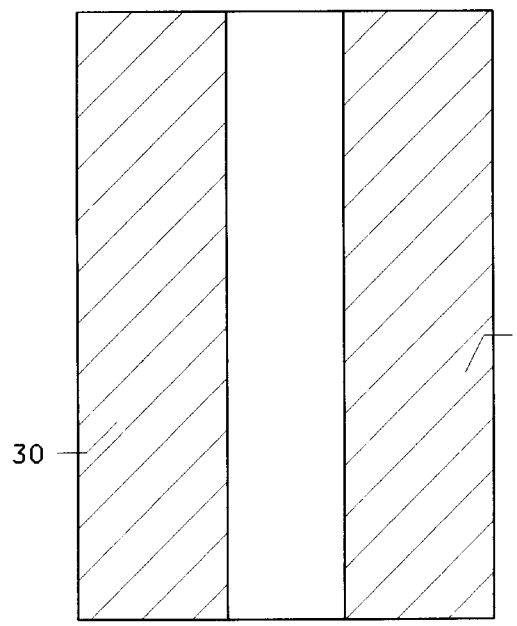
FIG. 3 is a cross sectional view of the thermocouple protective tube of the FIG. 1 thermocouple assembly manufactured from rolled insulating fibers.

Referring now to FIG. 3 it will be seen that the protective tube assembly (22) is made from a tube (30) made from ceramic fiber paper manufactured by the fiber division of The Carborundum Co. Of Niagara Falls N.Y. 14302 as their grade 970 ceramic fiber paper. This paper is rolled over a mandrel of desired diameter to have a plurality of layers overlapping each other. The fiber paper, before rolling over the mandrel, is soaked with an organic binder such as silica rigidizer which assist in binding the paper layers together and building up the tube (30) thickness to a desired size. This binder is available from PQ Corporation of Valley Forge 19482 and is known as Nyacal AL20 binder. In experiments the optimum pipe dimensions for this application were found to be 48" L×2" OD×¾" ID. Then, the rolled pipe or tube (30) was inserted into an oven to dry at 250–300° F. degrees, for a sufficient time to harden the pipe constituents.

Figure 4:
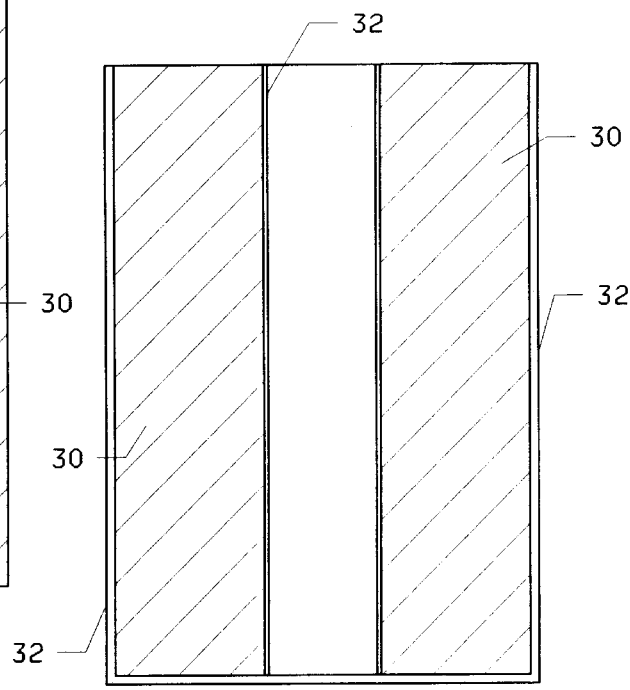
FIG. 4 is a cross sectional view of the thermocouple of FIG. 3 coated with a thin layer of refractory oxide of $Al_2O_3$.
Figure 5:
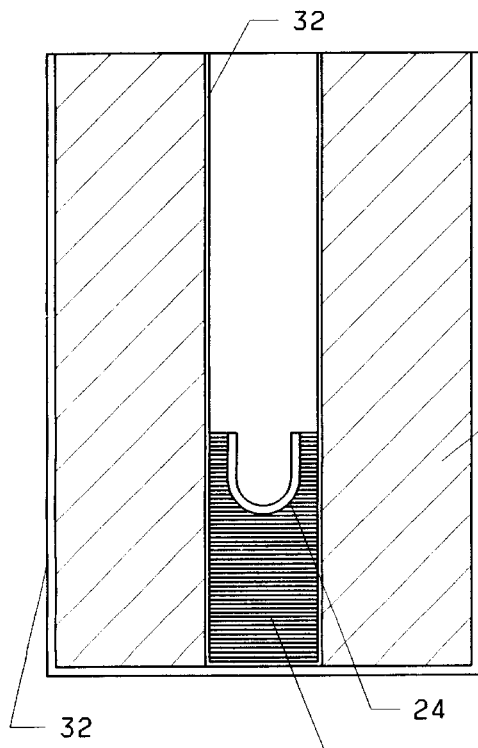
FIG. 5 is a cross sectional view of the coated thermocouple protected tube of FIG. 4 having a graphite plug inserted in one end of the tube.
Figure 6:
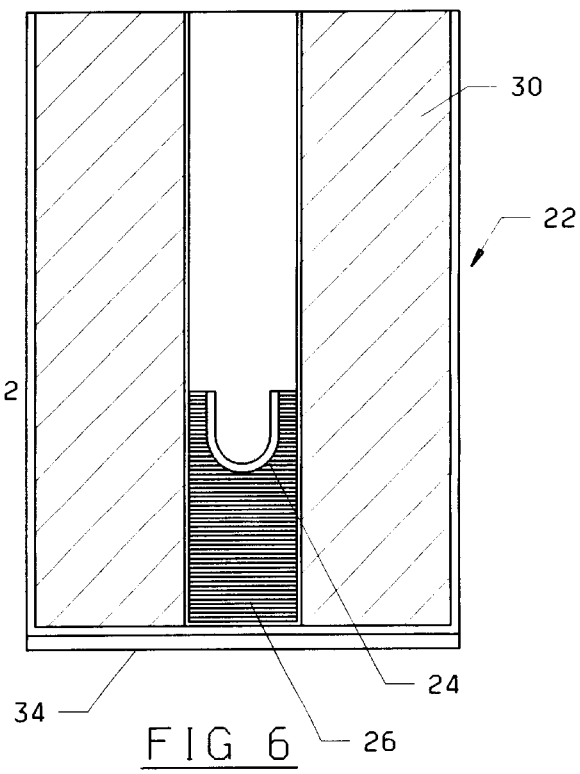
FIG. 6 is a cross sectional view of the FIG. 5. tube with cement coating covering the plugged end of the tube and graphite plug.

Referring next to FIG. 4, the pipe (30) was then immersed into a refractory coating of alumina >90% to coat the inside and outside walls of the tube with a protective coating (32). The desired coating thickness was around ¹⁄₁₆" to ⅛". Again, the pipe (30) was transferred to a hot oven to slowly heat up to around 300° F. This usually took a period of four hours to eight hours to cure the wash coat. Referring now to FIGS. 5 and 6, to complete manufacturing the pipe (tube) the plug (26) made from a graphite of special grade and treatment, referred to in the industry as infiltrated graphite. It is graphite which is flame sprayed with SiC or some other refractory suitable oxide. This plug is plugged into one end of the tube end is cemented into that end of the pipe with a layer (34) of cement.

The cement layer (34) used for this operation is based on alumina silica mixed powders with sodium silicate plus water as an organic binder. This coating proved to be well adherent to fiber and graphite and resistant to molten metal and high temperature. In formulating the coating (34) under consideration various pore sizes and physical conditions were selected to achieve maximum particle packing and uniformity, so that shrinkage and cracks are eliminated upon drying and heating. Therefore, a range of particle sizes were used. Using the same size particles results in a over 30% void space. Adding particles of size equivalent to the largest void reduces the void content to 26%. Adding a third still smaller particle size can reduce the pore volume to 23%. Therefore to achieve a maximum particle packing a range of particle sizes is required. Small size particles improve the bonding characteristics of the binder. The two particle sizes were chosen from the following table of mesh sizes.

| ASTM STANDARD SCREEN SIZES | |
| --- | --- |
| MESH SIEVE DESIGNATION | SIEVE OPENING |
| 40 | 0.42 mm 0.0165 in. |
| 120 | 0.125 mm 0.0049 in. |

To obtain optimum strength and to eliminate shrinkage the cement or binder was made from the following formulation.

| A. REFRACTORY POWDER MATERIALS | | | |
| --- | --- | --- | --- |
| Material | Condition | Mesh Size | Range Nominal Percent |
| 1. Kyanite | raw (not fired) | 48-35 | 60–50 |
| 2. Kyanite | raw (not fired) | about 200 | 12–8 |
| 3. Mullite | fired Kyanite | 35 | 12–8 |
| 4. Peerless | plastic, fire clay | >35 | 16–10 |

-continued

A. REFRACTORY POWDER MATERIALS

| Material | Condition | Mesh Size | Range Nominal Percent |
|---|---|---|---|

B. ORGANIC BINDER

| Material | Range Nominal Percent |
|---|---|
| 1. Sodium silication solution #52 | 80–90 |
| 2. Water | 10–20 |

C. SUMMARY OF CEMENT INGREDIENTS

| Materials | Nominal Composition |
|---|---|
| Retractory Powders | 70–80 percent |
| Organic Plus Water Binder | 20–30 percent |

In formulating the bonding mortar as described above in this application, several ingredients of refractory powders were mixed with an organic binder of silicate diluted with water. The refractories selected were optimized to maximize packing and uniformity. This is achieved by including around 50–60 wt. percent of the raw kyanite and 8 to 10 percent of fired kyanite (mullite) mixed with fine fire clay referred to as peerless clay. The inclusion of mullite helps in reducing shrinkage upon firing the cement. Also the powders selected were based on mixing plastic and non plastic powders grains (peerless vs. Kyanite) in order to optimize shrinkage of the mortar cement upon heating. In essence, the formulation of this type of mortar cement proved in the field as a durable, high temperature material, and adherent to various metals such as steel and aluminum, and less shrinkage or cracking upon heating.

The above described cement is an optimum composition to achieve mechanical and chemical properties required in assembling the thermocouple protection tube to the graphite end-plug to minimize thermal shock and withstand the high temperatures found in the use of the assembly.

The coating (wash coating) shown in FIG. 4, is basically a high alumina grade paint type 670 made by Aremco of Ossining N.Y. 10562. The use of said wash coat is beneficial in protecting the tube from molten metal attack, i.e. of Aluminum reduction to the binder $SiO_2$ used in wrapping the pipe. This is demonstrated in the following chemical equation.

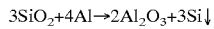

$$3SiO_2 + 4Al \rightarrow 2Al_2O_3 + 3Si\downarrow$$

Therefore, $SiO_2$ is reduced to Si metals which affect the metal bath constituents. In other words an $Al_2O_3$ basic constituent used as a wash coat as demonstrated in this embodiment will reduce metal attack and increase the life of the thermocouple protection tube.

An alternate method used to manufacture the thermocouple protection tube device assembly (22) which may be used in conjunction with thermocouple (12) and measure molten metal temperatures such as aluminum and steel is constructed as described below.

It was explained in the previous example that wrapping fiber paper to consolidate the tube on a mandrel may be modified. The change introduced is to use high alumina paper such as Saffil in the final layers of the pipe making. Therefore, the pipe was made of inner material (paper) of nominal composition $50Al_2O_3$, $50SiO_2$, beefed up with a few layers of Kaowool 3000 insulating paper, a high alumina refractory. The pipe was then brush coated or immersed in a high alumina wash coat manufactured by Aremco. In this final wrapping stage an Alumina rigidizer Al-20 made by Armco was used instead of the Colloidal Silica previously used in example 1. To complete assembling the device, a graphite plug of a special grade preferably to exceed 3 inches long was used. It was obtained as double infiltrated with salts to inhibit oxidation of graphite and/or deposited SiC by plasma flame spraying or CVD of SiC over the farthest end of the graphite plug. Such a plug was cemented into the tube to close one end tight, using cement described in the previous example. After drying at room temperature for a few hours the tube is dried at 250–300° F. for a two to four hour period.

TABLE 2

OXIDATION RATE OF GRAPHITE IN 1400° F. AIR FOR 24 HOURS

| material | condition | loss weight % |
|---|---|---|
| graphite | not impregnated (not treated) | 90 |
| graphite | single impregnation | 31 |
| graphite | double impregnation | 20 |
| graphite | protected w/SiC | 10 |

The thermocouple protection tube is constructed to withstand metal erosion and oxidation. The graphite used as a plug in the bottom of the tube should be less oxidized than air atmosphere because of scarcity of oxygen in the melt. The body of the tube is rigid and withstands physical abuse and is thermal shock resistant because the fibrous layers absorb thermal shock much easier than a solid tube such as very dense cast shape as SiC or other ceramics suggested by the prior art. Also, it is feasible to construct a pipe, a thermocouple protection tube of any desired lengths 2–10 feet by coupling pipes together by using the previously described cement or binder or through matching inner and outer threads on extension pipes and inner threads on the open end of tube (30).

It will be understood that certain modifications and additions have been deleted herein for the sake of conciseness and readability but are fully intended to fall within the scope of the following claims.

What is claimed is:

1. A temperature sensing assembly for temperature monitoring of molten metal processes comprising:
   a temperature measuring device;
   a high temperature protective tube formed from layers of insulating cloth of refractory oxides bound together with inorganic rigidizers surrounding such temperature measuring device;
   a high temperature heat conductive plug for sealing said temperature measuring device in said tube to allow for increased temperature sensitivity of said measuring device while protecting said measuring device from molten metal when monitoring the temperature thereof; and
   said plug being cemented to said protective tube using a high temperature adhesive mixture of $Al_2O_3$ and $SiO_2$ powder mixed with an inorganic binder and water.

2. An assembly as set forth in claim 1 wherein said temperature measuring device is a thermocouple and said plug has a hollow portion for fitting a junction end of the thermocouple therein to increase the temperature reaction time thereof.

3. An assembly as set forth in claim 2 wherein said plug is made from a special high grade heat conducting infiltrated graphite material resistant to high temperature oxidation and erosion.

4. An assembly as set forth in claim 1 wherein said inorganic binder is $Na_2SiO_4$.

5. An assembly as set forth in claim 1 wherein said protective tube comprises an insulating cloth of ceramic fiber paper soaked with silica rigidizers.

6. An assembly as set forth in claim 5 wherein said insulating cloth has a refractory alumina coating on the inside and outside of said protective tube.

7. An assembly as set forth in claim 6 wherein said plug is infiltrated with inert chemical compounds in pores of graphite to increase heat conductivity and minimize high temperature oxidation.

8. An assembly as set forth in claim 1 wherein said layers of insulating cloth are made from high alumina paper having layers of high alumina refractory.

9. An assembly as set forth in claim 8 wherein said refractory is Kaowool refractory.

10. An assembly as set forth in claim 1 wherein said plug is formed as a conical body to increase the response time of said temperature measuring device which includes a thermocouple assembly the end of which is enclosed at the end of said plug.

* * * * *